United States Patent
Kubiak

(10) Patent No.: US 8,578,699 B2
(45) Date of Patent: Nov. 12, 2013

(54) CONTROL SYSTEM FOR TURBOJET ENGINE NACELLE

(75) Inventor: Benoit Kubiak, Saint Romain de Colbosc (FR)

(73) Assignee: Aircelle, Gonfreville l'Orcher (FR)

(*) Notice: Subject to any disclaimer, the term of this patent is extended or adjusted under 35 U.S.C. 154(b) by 761 days.

(21) Appl. No.: 12/867,390

(22) PCT Filed: Nov. 21, 2008

(86) PCT No.: PCT/FR2008/001633
§ 371 (c)(1),
(2), (4) Date: Aug. 12, 2010

(87) PCT Pub. No.: WO2009/101274
PCT Pub. Date: Aug. 20, 2009

(65) Prior Publication Data
US 2010/0313546 A1    Dec. 16, 2010

(30) Foreign Application Priority Data

Feb. 13, 2008 (FR) ...................................... 08 00772

(51) Int. Cl.
*F02K 1/76* (2006.01)

(52) U.S. Cl.
USPC ............. 60/226.3; 60/226.2; 60/771; 60/230; 239/265.19; 239/265.29; 239/265.33; 244/110 B

(58) Field of Classification Search
USPC ............. 60/771, 230, 226.2, 226.3, 233; 244/110 B; 239/265.19, 265.33, 239/265.37, 265.43, 265.29
See application file for complete search history.

(56) References Cited

U.S. PATENT DOCUMENTS

| | | | | |
|---|---|---|---|---|
| 3,779,010 A * | 12/1973 | Chamay et al. | ............... | 60/226.2 |
| 5,778,659 A * | 7/1998 | Duesler et al. | ............... | 60/226.1 |
| 6,655,125 B2 * | 12/2003 | Johnson et al. | ............... | 60/226.2 |
| 7,127,880 B2 * | 10/2006 | Lair et al. | .................... | 60/204 |
| 7,174,704 B2 * | 2/2007 | Renggli | .................... | 60/204 |

FOREIGN PATENT DOCUMENTS

| EP | 0843089 | 5/1998 |
|---|---|---|
| FR | 701058 | 3/1931 |
| FR | 707098 | 7/1931 |
| FR | 2872222 | 12/2005 |
| FR | 2902839 | 12/2007 |
| WO | 2005026518 | 3/2005 |

OTHER PUBLICATIONS

International Search Report; PCT/FR2008/001633; Aug. 5, 2009.

* cited by examiner

*Primary Examiner* — Phutthiwat Wongwian
*Assistant Examiner* — Steven Sutherland
(74) *Attorney, Agent, or Firm* — Brinks Hofer Gilson & Lione

(57) ABSTRACT

The invention relates to a turbojet engine nacelle that includes a power supply source (113) for a system for actuating and controlling a thrust reverser device (121), and for a system for actuating and controlling a variable nozzle device (120), characterised in that the power supply can be switched between a first position in which it powers the system for actuating and controlling the thrust reverser device, and a second position in which it powers the system for actuating and controlling the variable nozzle device, wherein the switching is carried out under the action of a control output from a computer (103) capable of receiving a thrust reverser opening control (100).

11 Claims, 4 Drawing Sheets

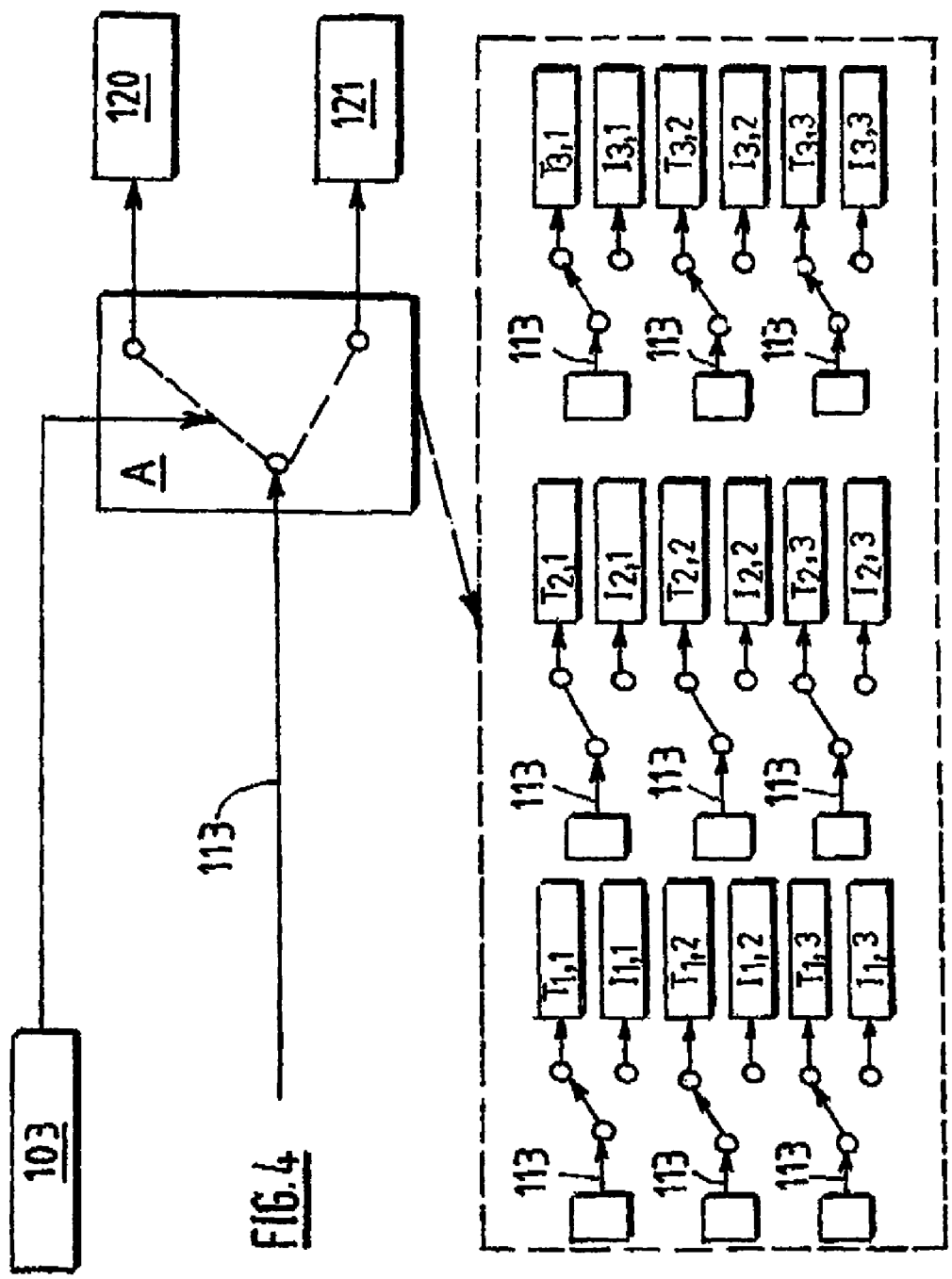

CONTROL SYSTEM FOR TURBOJET ENGINE NACELLE

TECHNICAL FIELD

The present invention concerns a turbojet engine nacelle comprising a power supply source for a system for actuating and controlling a thrust reverser device and for a system for actuating and controlling a variable nozzle device.

BACKGROUND

An airplane is moved by several turbojet engines each housed in a nacelle also housing a set of attached actuating devices related to its operation and performing various functions when the turbojet engine is in use or stopped. These related actuating devices comprise in particular an electromechanical or hydromechanical system for actuating variable nozzle maneuvering. They can also comprise an electromechanical or hydromechanical system for actuating maneuvering of a thrust reverser system and a system for actuating cowlings designed to allow maintenance operations on the turbojet engine.

The role of the thrust reverser is, during landing of an airplane, to improve the braking capacity thereof by redirecting at least part of the thrust generated by the turbojet engine forward. In this phase, the reverser makes it possible to send all or part of the gas streams ejected by the turbojet toward the front of the nacelle, thereby generating a counter-thrust that is added to the braking of the airplane wheels. To do this, a thrust reverser comprises, on either side of the nacelle, a mobile cowling able to be moved between a deployed position, on one hand, that opens a passage in the nacelle intended for the streams deviated during a braking phase, and a retracted position, on the other hand, which closes said passage during the normal operation of the turbojet engine or when the airplane is stopped.

Currently, the actuating systems are primarily implemented via hydraulic or pneumatic cylinders. These cylinders require a transport grid for a pressurized fluid obtained either by air-tapping on the turbojet engine or by withdrawal on the hydraulic circuit of the airplane. However, such systems are bulky and require significant maintenance, because the slightest leak in the hydraulic or pneumatic grid can have harmful consequences both on the reverser and other parts of the nacelle. Moreover, the hydraulic or pneumatic cylinders also deliver the maximum possible power, which causes premature wear of the equipment.

To offset the drawbacks related to the pneumatic and hydraulic systems, nacelle builders and equipment manufacturers have sought to replace them and use electrical actuating systems as much as possible so as to lighten the nacelle and simplify its operation, in particular during the necessary maintenance cycles and the management of hydraulic or pneumatic fluids. Certain nacelle cowlings already exist designed for turbojet engine maintenance that are actuated by electric cylinders, and an electrically actuated thrust reverser is described in document EP 0 843 089.

Electric actuating systems allow optimal energy management as a function of the power actually necessary for the operation of these systems while also taking up less space in the nacelle and not requiring pressurized fluid circulation circuit. They also make it possible to integrate electronic control and steering systems, as described in French applications 04.07096, 07.07098 and 07.01058, for example.

Aeronautic regulations (FAR-JAR 25-933) require that thrust reverser control systems be protected from risks of untimely deployment through the establishment of a triple-locking system of the control members of the thrust reverser whereof the control must be segregated.

In the case of a hydraulic control system like the one that exists on the A340-500/600, each mobile reverser cowling has a tertiary bolt electrically steered by an independent device, and two so-called primary bolts installed in the upper and lower cylinders, the hydraulic control of which is allowed by joint steering of a first valve and a second valve for closing the hydraulic supply circuit of the cylinders. The steering of the two valves is done via two completely segregated steering lines.

Under flight conditions, the first valve remains closed and the hydraulic power is therefore not available to allow any unlocking of the primary bolts by the second valve alone.

In the case of an electrical system for actuating a thrust reverser, the movement command of the thrust reverser lever is first captured by a set of segregated computers.

A first computer is designed to control only the unlocking of the tertiary bolt, which therefore remains controlled by a dedicated control line.

The control of each primary bolt is authorized from a control unit receiving, on one hand, the necessary power supply controlled by a second computer and an opening order coming from a turbojet engine computer (FADEC or EEC).

Thus, when the pilot orders the opening of the thrust reverser, that order is captured by:
- the first computer, which then orders the opening of the tertiary bolt,
- the second computer, which then authorizes the power supply of the control systems of the primary bolts,
- the turbojet engine computer, which, depending on the operating parameters of the turbojet engine that are representative of the flight phases, authorizes or denies the opening.

One therefore understands that an electrical problem affecting the control of the tertiary bolt would not allow the unlocking of the primary bolts, since that control line is completely independent from it.

An electronic problem on the turbojet engine computer would also not by itself allow an untimely opening of the thrust reverser since, in the absence of an order from the second computer, no power supply is available.

Reciprocally, in case of error by the second computer allowing the power supply of the control systems of the primary bolts, the latter would not open since these control systems would not have the order from the engine computer.

The first and second computers generally use data from the aircraft not related to the engine, in particular, for example, altimetric data or data representative of the weight exerted on the wheels of the landing gear, inter alia.

The third computer, i.e. the engine computer, uses data representative of the operating system of the turbojet engine.

Such an architecture of the security system of the thrust reverser poses a problem when one wishes to group together, on a same power supply source, several functionalities used in flight, and more particularly a variable nozzle functionality. The interest of grouping several functionalities together on a same electrical power source is obvious. This avoids cluttering the nacelle and making it heavier with dedicated power supply systems for each functionality.

These two systems, thrust reverser and variable nozzle, have different operating moments, i.e. in landing phase and in coasting flight phase, respectively, during which the turbojet engine is in operation.

Thus, the electrical power delivered to the nacelle control system can no longer serve as discriminating security test since the power supply source can deliver electrical current during a usage phase of the airplane that does not concern the thrust reverser. The power supply therefore no longer serves as line of defense by itself.

More precisely, the test done by the second computer would be continuously validated, the output from the control units for the primary bolts would therefore be reduced to the order coming from the engine computer.

This third line of defense therefore needs to be restored so as to meet the air safety standards.

BRIEF SUMMARY

To do this, the present invention concerns a turbojet engine nacelle comprising a power supply source for a system for actuating and controlling a thrust reverser device and a system for actuating and controlling a variable nozzle device, characterized in that the power supply can be switched between a first position in which it powers the system for actuating and controlling the thrust reverser device, and a second position in which it powers the system for actuating and controlling the variable nozzle device, wherein the switching is carried out under the action of a control output from a computer capable of receiving a thrust reverser opening command.

Thus, by providing for a supply that can be switched between the two actuating and control systems under the action of a controller receiving a deployment order, the power source can be oriented toward one or the other of the systems depending on the flight phases. In this case, when one actuating and control system is electrically powered, the other system is not, which restores the security line on the power supply.

Preferably, in the absence of thrust reverser opening command and a corresponding output from the computer, the power source is oriented toward the system for actuating and controlling the variable nozzle.

Advantageously, the computer is capable of receiving data representative of the operating phase of the airplane, for example of the type concerning the weight exerted on the wheel or altimetric data.

Preferably, the system for actuating and controlling the thrust reverser comprises at least two primary bolts associated with at least one control unit capable of controlling the unlocking of the primary bolts when the power supply is oriented toward the system for actuating and controlling the thrust reverser and when it receives a corresponding opening order from a second computer capable of receiving a thrust reverser opening order.

Advantageously, the second computer is a computer capable of receiving data representative of the operation of the turbojet engine.

Also advantageously, the second computer is the FADEC.

Preferably, the system for actuating and controlling the thrust reverser comprises a third distinct computer capable of receiving an opening order from the thrust reverser and sending a corresponding order output controlling the power supply of a tertiary bolt for its unlocking.

Advantageously, the power supply of the tertiary bolt is done from a power line distinct from the main power source of the actuating and control systems of the thrust reverser and the variable nozzle.

Advantageously, the systems for actuating and controlling the thrust reverser and the variable nozzle are primarily housed in at least two distinct housings.

Advantageously, the primary power supply source of the actuating systems of the variable nozzle is at the disposal of other related functions of the nacelles such as maneuvering maintenance cowlings.

Also advantageously, the nacelle comprises two primary power supply sources capable of being used selectively as a function of their availability toward at least three related functions among the system for actuating the variable nozzle, the thrust reverser and maintenance cowlings.

BRIEF DESCRIPTION OF THE DRAWINGS

The implementation of the invention will be better understood using the detailed description that follows in reference to the appended drawing.

FIG. 4 diagrammatically illustrates a power supply capable of being switched.

DETAILED DESCRIPTION

Figure 1:
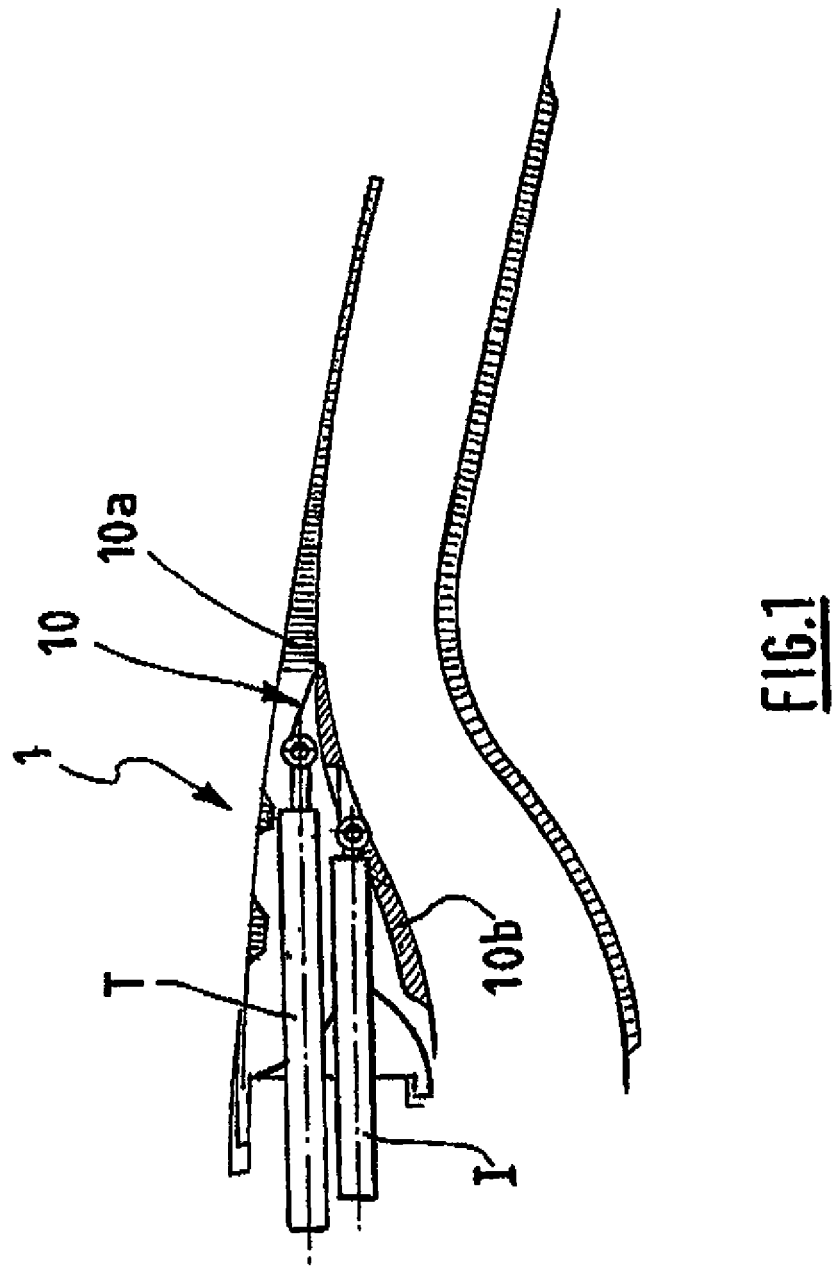
FIG. 1 is a partial diagrammatic view in longitudinal cross-section of a turbojet engine nacelle equipped with a thrust reverser and having a variable nozzle functionality.

A nacelle according to the invention as partially illustrated in FIG. 1 is equipped with a thrust reverser device 1 and has a variable nozzle functionality.

The thrust reverser 1 comprises, on one hand, cascades (not visible) for at least one portion of an airstream from the turbojet engine, and on the other hand, at least one cowling 10 mobile in translation along an essentially longitudinal direction of the nacelle capable of going alternatingly from a closing position in which it ensures the aerodynamic continuity of the nacelle and covers the cascades, to an opening position in which it opens a passage in the nacelle and exposes the cascades.

Each mobile cowling 10 comprises an outer portion 10a and an inner portion 10b each mounted mobile in translation and each connected to at least one electric actuating cylinder T, I capable of allowing their longitudinal translation. The outer portion of the mobile cowling thus forms a variable-section jet nozzle that can be actuated by the actuating cylinder T.

More precisely, a nacelle generally has two such mobile cowlings 10 each covering essentially a half-portion of the nacelle and each actuated by three electric actuators I1, I2, I3 for the thrust reverser function. The upper and lower electric actuators of each mobile cowling 10 are connected to so-called primary locking means 50. The mobile cowling 10 is connected to a so-called tertiary locking means 60 generally mounted near a guide rail of the latter.

Figure 2:
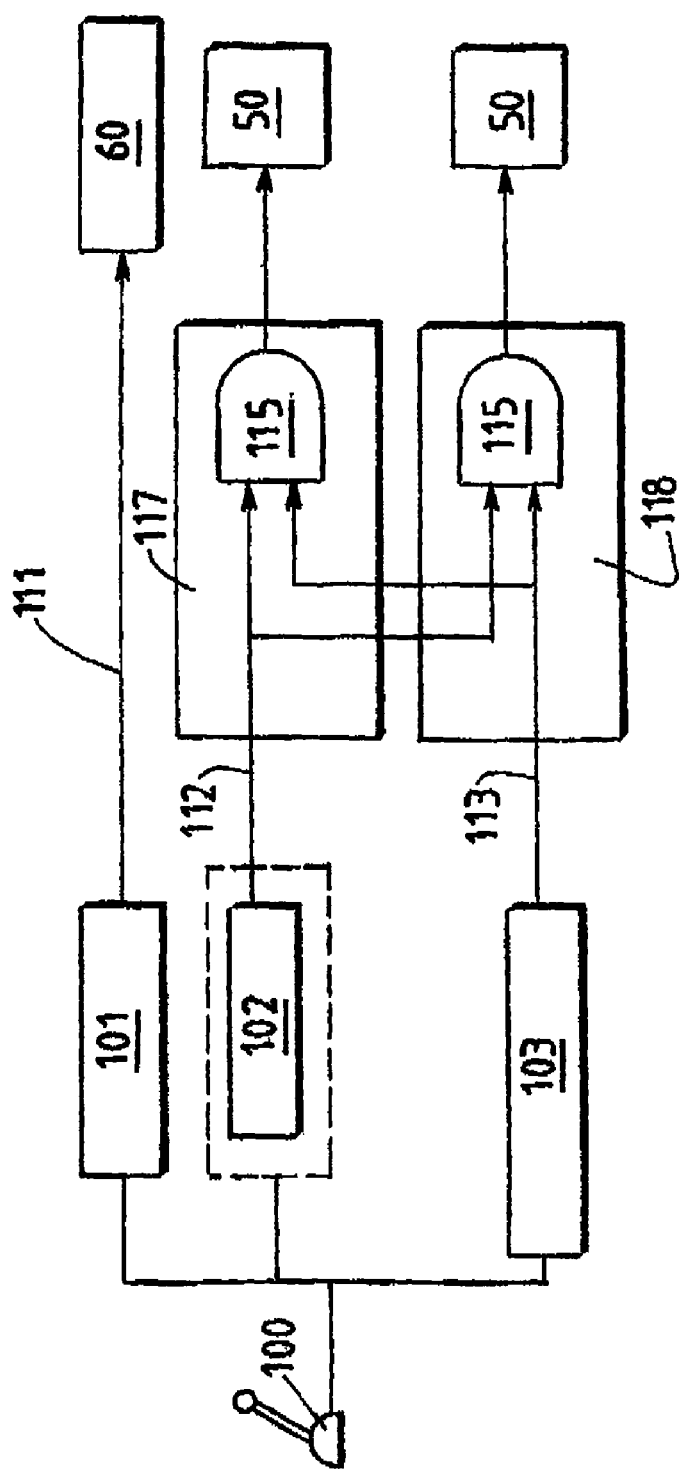
FIG. 2 diagrammatically illustrates a security system according to the prior art for a nacelle not having a variable nozzle functionality.

A control system equipping a nacelle not having a variable nozzle functionality is diagrammatically illustrated in FIG. 2.

In such a configuration, a thrust reverser opening order given by the action of the pilot on a lever 100 is captured by three computers 101, 102, 103.

A first computer 101 is designed to control the opening of the tertiary bolt 60 along a completely separate dedicated control line 111.

A second computer 102 is designed to control the opening of the primary bolts 50, and to that end sends a corresponding order along a control line 112.

A third computer 103 is intended to control the high-power power supply of the thrust reverser system 1 and is distributed to the primary bolts along a line 113. More particularly, the second computer 102 is an airplane computer of the turbojet engine known under the name FADEC (or EEC).

The power line 113 and the control line 112 constitute input data for a control unit 115 of each primary bolt housed in separate control housings 117, 118, each control unit 115 only ordering the unlocking of the corresponding primary bolt 50 if the power supply conditions and deployment order conditions are met; i.e. the line 113 is indeed delivering a sufficient power supply and the control line 112 is indeed delivering an opening order.

Thus, the actuating and control system of the thrust reverser 1 indeed has three lines of defense against possible failures.

Figure 3:
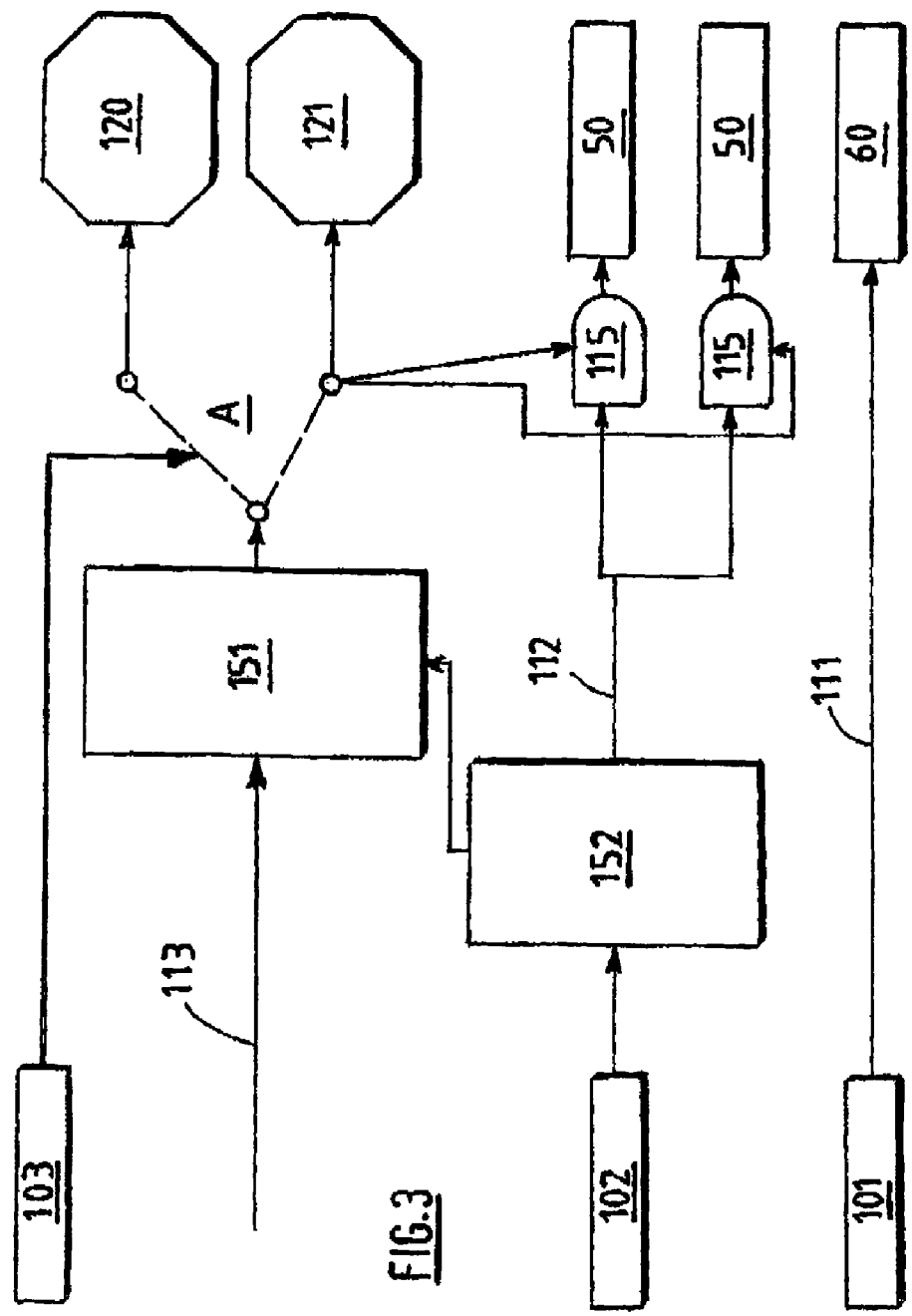
FIG. 3 diagrammatically illustrates a security system according to the invention for a nacelle comprising a thrust reverser and a variable nozzle functionality.

Such a control system equipping a nacelle having a variable nozzle functionality is diagrammatically illustrated in FIG. 3.

Such a system is distinguished from the system of the figure primarily in that the third computer 103 controls a switch A making it possible to switch the power line 113 either toward the system 120 for actuating and controlling the variable nozzle and the electric cylinders T1, T2, T3, or toward the system for actuating and controlling the thrust reverser 1, comprising an actuating system 121 of the electric cylinders I1, I2, I3.

One will also note that the power line 113 and the control line 122 pass through an engine control housing 151, making it possible to control the power supply as a function of a control logic, the necessary power supply not necessarily being identical for each functionality, and a control and monitoring housing 152, making it possible to implement a control logic as a function of parameters of the turbojet engine delivered by the FADEC 102 and communicating with the power supply control housing, respectively.

Owing to the invention, the line of defense constituted by the power supply is restored. The nacelle can thus be equipped with a variable nozzle and a thrust reverser device that will be electrically powered by a same power supply source.

FIG. 4 is a diagrammatic illustration of one possible implementation of the switch A between the system for actuating and controlling the variable nozzle (three electric engine cylinders) and the system for actuating and controlling the thrust reverser device (three electric cylinders).

In the case in point, each electric actuating cylinder of the nozzle T1, T2, T3 and each electric actuating cylinder of the corresponding reverser I1, I2, I3 is equipped with a switch capable of switching over under the effect of an order coming from the control line 112 between a position making it possible to power the electric cylinders T1, T2, T3 and a position making it possible to power the related electric cylinders I1, I2, I3. FIG. 4 shows the switches in the position powering the electric nozzle cylinders. Each electric cylinder T1, T2, T3, I1, I2, I3 being powered in three-phase current, there are therefore nine controllable switches respectively powering the power supplies for phase T1.1 or I1.1; T1.2 or I1.2; T1.3 or I1;3; T2.1 or I2.1; T2.2 or I2.2; T2.3 or I2.3; T3.1 or I3.1; T3.2 or I3.2; T3.3 or I3.3

Of course, other configurations allowing such switching over of the power supply are possible.

Although the invention has been described with one particular embodiment, it is obviously in no way limited thereto and comprises all technical equivalents of the means described as well as their combinations if they are within the scope of the invention.

The invention claimed is:

1. A turbojet engine nacelle comprising a power supply source for a system for actuating and controlling a thrust reverser device and a system for actuating and controlling a variable nozzle device, wherein the power supply that supplies power to a switch that switches between a first position in which the switch powers the system for actuating and controlling the thrust reverser device, and a second position in which the switch powers system for actuating and controlling the variable nozzle device, wherein the switching is carried out under the action of a control output from a computer capable of receiving a thrust reverser opening command.

2. The nacelle according to claim 1, wherein in the absence of a thrust reverser opening order and a corresponding output from the computer, the power supply is oriented toward the system for actuating and controlling the variable nozzle.

3. The nacelle according to claim 1, wherein the computer is capable of receiving data representative of operating phase of the airplane.

4. The nacelle according to claim 1, wherein the system for actuating and controlling the thrust reverser comprises at least two primary bolts associated with at least one control unit capable of controlling unlocking of the primary bolts when the power supply is oriented toward the system for actuating and controlling the thrust reverser and when it receives a corresponding opening order from a second computer capable of receiving a thrust reverser opening order.

5. The nacelle according to claim 4, wherein the second computer is a computer capable of receiving data representative of operation of the turbojet engine.

6. The nacelle according to claim 5, wherein the second computer is the FADEC .

7. The nacelle according to claim 1, wherein the system for actuating and controlling the thrust reverser comprises third distinct computer capable of receiving an opening order from the thrust reverser and sending a corresponding control output controlling the power supply of a tertiary bolt for its unlocking.

8. The nacelle claim 7, wherein the power; supply of the tertiary bolt is from a supply line separate from the primary power supply source of the systems for actuating and controlling the thrust reverser and variable nozzle.

9. The nacelle according to claim 1, wherein the systems for actuating and controlling the thrust reverser and the variable nozzle are primarily housed in at least two separate housings.

10. The nacelle according to claim 1, wherein the primary power supply source of the systems for actuating the variable nozzle is put at disposal of other related functions of the nacelle.

11. The nacelle according to claim 1, wherein two primary power sources capable of being used selectively as a function of their availability toward at least three related functions among the system for actuating the variable nozzle, the thrust reverser and maintenance cowlings.

* * * * *